ent Office 2,838,552
Patented June 10, 1958

2,838,552

NEW CHLORAMPHENICOL ESTERS AND METHOD OF SYNTHESIZING SAME

Gerhard Gansau, Mannheim-Waldhof, Erich Haack, Heidelberg, Werner Heimberger, Ludwigshafen (Rhine), and Georg Stoeck, Mannheim-Waldhof, Germany, assignors to C. F. Boehringer & Soehne G. m. b. H., Mannheim-Waldhof, Germany, a corporation of Germany No Drawing. Application June 28, 1956
Serial No. 594,373

Claims priority, application Germany July 7, 1955

3 Claims. (Cl. 260—410.6)

This invention relates to new esters of chloramphenicol and to the method of synthesizing these esters.

The antibiotic chloramphenicol, having the composition and structure of a D-(−)-threo-2-dichloro-acetamido-1-p-nitrophenyl-1,3-propanediol

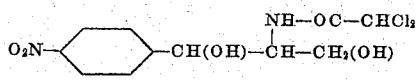

is an important therapeutic agent, on account of its strong bacteriostatic action against a large number of microorganisms. One great advantage is that it is fully effective when taken orally.

Unfortunately, chloramphenicol has a rather persistent bitter taste, which is so disagreeable that orally it can only be dispensed in troches or capsules. In pediatric cases administration in this form encounters very often considerable difficulties. Attempts were made quite early to overcome these disadvantages by searching for tasteless derivatives, which would easily split and liberate chloramphenicol in the body. Such derivatives could be administered in form of solutions or syrups. Thus, German Patent No. 879,840 relates to the esterification of chloramphenicol with long chain fatty acids, such as palmitic or stearic acid, at the primary hydroxy group. U. S. Patent No. 2,568,555 relates to the synthesis of tasteless chloramphenicol acetals. However, according to our investigations, these derivatives are not completely split in the body and inasmuch as chloramphenicol is rather expensive and only the free chloramphenicol is fully effective, the use of the above-mentioned derivatives for therapeutic purposes is uneconomical.

On the other hand, in order to fully exhaust the therapeutic value of chloramphenicol, the possibility of an effective parenteral application is of utmost importance. Hitherto, solutions and crystalline suspensions of chloamphenicol have been used for this purpose. Unfortunately, chloramphenicol is soluble only to a limited degree in solvents customarily used for injections so that a highly concentrated solution, which is indicated in certain cases, cannot be prepared. Apart from these considerations, the parenteral application of solutions or crystalline suspensions of chloramphenicol is greatly reduced in value because, if applied in this manner, chloramphenicol is easily absorbed and quickly excreted by the body.

The principal object of this disclosure is to provide new chloramphenicol esters characterized by the following properties:

(1) These esters split quantitatively within the body into chloramphenicol and the free acid so that for all practical purposes the full amount of chloramphenicol that has been administered is therapeutically effective;

(2) The solubility rates of these new esters provide a suitable basis for parenteral applications.

It is another object of this disclosure to provide methods of synthesizing this new group of chloramphenicol esters.

These and other objects will appear more fully from the herein following detailed description and from the claims.

The new chloramphenicol esters of this invention are prepared by acylating one or both hydroxyl groups of chloramphenicol with α-hydroxy acids, resulting in compounds of the following general formula:

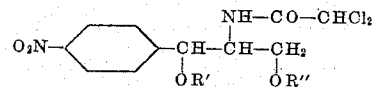

wherein R' represents hydrogen and an O-acylated α-hydroxy acid radical and R" represents an O-acylated α-hydroxy acid radical.

The synthesis of these esters is carried out by employing either an acylating functional derivative of an α-hydroxy acid ester or the acid itself. Particularly useful are the acid chlorides and acid bromides, respectively. By means of a suitable choice of reaction conditions, either mono- or di-esters can be prepared.

These new esters are not only substantially tasteless but are quantitatively broken down into their components with surprising rapidity by the body enzymes. The molecular size of the acyl radical of the α-hydroxy acid component is of particular importance, whether the compound is to be used as a tasteless oral preparation or in form of a solution, for example, for intramuscular administration. For oral application, compounds comprising a high molecular acyl radical, such as a radical with 10 to 20 carbon atoms, are of advantage; for parenteral application low molecular acyl radicals are usually preferred, unless a high rate of retentiveness is desired, in which case high molecular acyl radicals are required.

For some therapeutic purposes it was found desirable to prepare compositions containing free chloramphenicol in addition to the mono- or di-esters of this invention. Moreover, mixtures of these new esters may be used as such or in combination with free chloramphenicol.

The following examples serve to illustrate the present invention without, however, limiting the same thereto.

EXAMPLE 1

Chloramphenicol-mono-stearoylglycolate-3

Stearoylglycolyl chloride is prepared by heating 12.5 g. (0.105 mol) of distilled thionylchloride to 50° C. and slowly adding 23.9 g. (0.068 mol) of stearoyl glycolic acid (melting point 88–89° C.). The reaction mixture becomes homogeneous after about 1½ hours and is kept at a water bath at 45–50° C. for an additional 16 hours. Excessive thionylchloride is then stripped from the reaction mixture by distilling in vacuo and the residue is taken up twice with 150 cc. of thiophene-free, dry benzene and is each time evaporated to dryness. 25.2 g. (99.8% of the theory) of the acid chloride are obtained in form of a white, crystalline material.

20.3 g. (0.063 mol) of chloroamphenicol are added to 7.5 g. (0.095 mol) of pyridine and 31 cc. of ethylene chloride. The mixture is heated slowly and at 65° C. the chloramphenicol goes into solution. At this point, a solution of 25.0 g. (0.069 mol) of stearoylglycolylchloride in 42 cc. of ethylene chloride is added drop by drop and the reaction mixture is held at 65° C. for one hour. At the end of this period the reaction mixture is cooled to room temperature and the clear, yellowish-brown solution is washed by shaking twice with 250 cc. of 0.1 N hydrochloric acid, once with 250 cc. of 2% sodium bicarbonate solution and once with water.

The ethylene chloride is stripped by distilling in vacuo at 40° C. and the oily residue (40.25 g. or 99.2% of the theoretical yield) is taken up in 100 cc. of hexane and kept in a refrigerator for two days to permit crystallization. Yield: 25.5 g. (62.8% of the theory), melting point 74–76° C.

Calculated: 57.50% C; 7.47% H; 4.33% N; 10.94% Cl. Found: 57.52% C; 7.43% H; 4.29% N; 10.69% Cl.

Additional 10.0 g. (24.6% of the theory) of the monoester can be isolated from the mother liquor (melting point 74–76° C.), and the supernatant liquid of this second crystallization yields, upon cooling to −80° C., 4.2 g. (10.3% of the theory), having a melting point of 40–43° C.

The following compounds are synthesized in the same manner:

Chloramphenicol-mono-arachinoylglycolate-3
Chloramphenicol-mono-palmitinoylglycolate-3
Chloramphenicol-mono-laurinoylglycolate-3
Chloramphenicol-mono-caprinoylglycolate-3
Chloramphenicol-mono-cinnamoylglycolate-3

EXAMPLE 2

*Chloramphenicol-mono-acetylglycolate-3*

95.0 g. (0.294 mol) of chloramphenicol are dissolved in 35.0 g. (0.443 mol) of pyridine and 250 cc. of ethylene chloride by heating to 65° C. To this a solution containing 44.4 g. (0.325 mol) of acetylglycolchloride in 100 cc. of ethylene chloride is added drop by drop. The reaction mixture is left standing at 65° C. for one hour and is then treated in the manner set forth in Example 1. The chloramphenicol-monoacetylglycolate-3 is an almost colorless oil. Yield: 124.3 g. (99.8% of the theory).

Calculated: 42.57% C; 3.81% H; 6.62% N; 16.76% Cl. Found: 42.29% C; 3.95% H; 6.51% N; 16.80% Cl.

The following compounds are synthesized in the same manner:

Chloramphenicol-mono-butyrylglycolate-3
Chloramphenicol-mono-oenathoylglycolate-3

EXAMPLE 3

*Chloramphenicol-mono-palmitoylglycolate-3*

Palmitoylglycolic acid chloride is prepared by heating 238.0 g. (2.0 mols) of distilled thionylchloride to 65° C. and slowly adding 314.5 g. (1.0 mol) of palmitoyl glycolic acid. The reaction mixture becomes homogeneous after about 1½ hours and is kept at a water bath at 45–50° C. for additional 16 hours. Excessive thionylchloride is then removed from the reaction mixture by distilling in vacuo and the residue is taken up twice with 300 cc. of thiophene-free, dry benzene and is each time evaporated to dryness. Yield: 332.9 g. (100.0% of the theory).

Calculated: 64.94% C; 9.99% H; 10.65% Cl. Found: 64.96% C; 10.02% H; 10.60% Cl.

To a suspension of 323.1 g. (1.0 mol) of chloramphenicol in 1,000 cc. of ethylene chloride and 118.7 g. (1.5 mols) of pyridine kept at 5–10° C. are added, over a period of 10 hours, 332.9 g. (1 mol) of palmitoylglycolic acid chloride in 1,800 cc. ethylene chloride while vigorously stirring. The reaction mixture is shaken twice with 3,000 cc. of 0.1 N hydrochloric acid, once with 2,000 cc. of 2% sodium bicarbonate solution and twice with 2,000 cc. of water. The small amount of sodium palmitoylglycolate precipitating during the treatment with bicarbonate solution is removed by vacuum filtration and the clear ethylene chloride solution is filtered over sodium sulfate and dried in vacuo at 40° C. to constant weight. Yield: 554.0 g. (89.4% of the theory).

In order to remove diesters which are present at a ratio of about 5 to 8%, the crude product is shaken with 1,900 cc. of petroleum ether (DAB 6, B. P. 50–70° C.) and 100 cc. ethylene chloride. The residue is separated by vacuum filtration and washed with petroleum ether. Yield: 432.5 g. (69.8 of the theory), melting point 63–66° C.

For purification, this monoester is recrystallized in diisopropylether. Yield: 372.0 g. (60.0% of the theory), melting point 66–68° C., $[\alpha]_D^{20}=0°$ (2%, ethyl acetate).

Calculated: 56.22% C; 7.16% H; 11.45% cl. Found: 56.20% C; 7.14% H; 11.47% Cl.

Paper-chromatographic analysis indicates a uniform substance. The $R_f$ value points to the presence of a 3-ester.

Upon repeating the separation of the mono-ester from the diester, additionally 10 to 20% of pure chloramphenicol-mono-palmitoylglycolate-3 can be recovered from the mother liquor.

EXAMPLE 4

*Chloramphenicol-di-acetylglycolate-1,3*

To a suspension of 53.2 g. (0.165 mol) of chloramphenicol in 150 cc. of ethylene chloride and 39.1 g. (0.495 mol) of pyridine kept at 30° C. are added, over a period of one hour while stirring, 50.0 g. (0.370 mol) of acetylglycolic acid chloride, dissolved in 250 cc. of ethylene chloride. Stirring is continued for another hour. The reaction mixture is then shaken twice with 1,000 cc. 0.1 N hydrochloric acid, once with 1,000 cc. of a 2% sodium bicarbonate solution and twice with 1,000 cc. of water.

The ethylene chloride solution is filtered over $Na_2SO_4$ and dried in vacuo at 40° C. to constant weight. Yield: 93.3 g. (90.0% of the theoretical).

This substance is a light yellow oil which shows no tendency to crystallize.

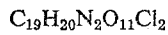

Calculated: 43.61% C; 3.85% H; 13.55% Cl. Found: 43.58% C; 3.86% H; 13.61% Cl.

Paper chromatography indicates that the material is uniform and the $R_f$ value that it is a diester.

Chloramphenicol, determined by means of the UV spectrum, amounts to 61.8. Calculated value 61.7%.

EXAMPLE 5

*Chloramphenicol-mono-butyrylglycolate-3*

238.0 g. of thionylchloride (freshly distilled and free of sulfurylchloride) are heated at 55–60° C. and 146.1 g. (1.0 mol) of butyrylglycolic acid (B. $P._2$ 108°) are added, over a period of one hour, while stirring. The reaction mixture is then left standing at 40–45° C. for 10 to 15 hours.

Excessive thionylchloride is removed by distilling in low vacuum at 45° C., whereupon butyrylglycol acid anhydride is recovered by fractionation: B. $P._{13}$ 85°. Yield: 152.0 g. (92.4% of the theory).

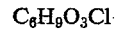

Calculated: 43.78% C; 5.51% H; 21.54% Cl. Found: 43.75% C; 5.45% H; 21.70% Cl.

To a suspension of 323.1 g. (1 mol) of chloramphenicol in 1,000 cc. of ethylene chloride (free of alcohol and water) and 118.7 g. (1.5 mols) of pyridine kept at 5 to 10° C. is added, by means of a capillary over a period of 15 hours, a solution of 164.6 g. of butyrylglycolic acid chloride in 1,800 cc. of ethylene chloride while vigorously stirring. The reaction mixture is then shaken twice with 3,000 cc. 0.1 N hydrochloric acid, once with 2,000 cc. of a 2% sodium bicarbonate solution and, finally, twice with 2,000 cc. of water. The ethylene chloride solution is filtered over sodium sulfate and dried in vacuo at 40° C. to constant weight. Yield: 413.0 g. (91.2 of the theory).

In order to remove diesters which are present at a ratio of about 10%, the crude product is recrystallized, first from ethylene chloride and then from sec. butyl alcohol. Yield: 278.0 g.; melting point 94–96° C.

$C_{17}H_{20}N_2O_8Cl_2$

Calculated: 45.24% C; 4.47% H; 15.71% Cl. Found: 45.23% C; 4.47% H; 15.75% Cl.

Paper chromatography indicates that the material is uniform and the $R_f$ value that it is a 3-monoester.

EXAMPLE 6

Chloramphenicol-di-butyrylglycolate-1,3

To a suspension of 323.1 g. (1.0 mol) chloramphenicol in 1,000 cc. of ethylene chloride (free of alcohol and water) and 237.4 g. (3.0 mols) of pyridine kept at 30° C. is added, over a period of one hour, a solution of 329.2 g. of butyrylglycolic acid chloride in 2,500 cc. of ethylene chloride. Stirring is continued for another hour, and the reaction mixture is shaken with 2,000 cc. of 0.5 N hydrochloric acid, with 3,000 cc. of 0.1 N hydrochloric acid, then with 2,000 cc. of a 2% sodium bicarbonate solution and, finally, twice with 2,000 cc. of water. The ethylene chloride solution is filtered over sodium sulfate and dried in vacuo at 40° C. to constant weight. Yield: 538.2 g. (93.0% of the theory).

The resulting substance is of oily consistency and seems to resist crystallization from various solvents. For purification, the crude material is dissolved in absolute acetone to which activated charcoal is added. After a slow boiling for 30 minutes, acetone is removed by filtration and evaporation under high vacuum.

$C_{23}H_{28}N_2O_{11}Cl_2$

Calculated: 47.68% C; 4.87% H; 12.24% Cl. Found: 47.63% C; 4.90% H; 12.25% Cl.

Paper chromatography indicates a uniform material and the $R_f$ value a 1,3-diester.

EXAMPLE 7

Chloramphenicol-cinnamoylglycolate-3

30.5 g. chloramphenicol are added to a solution of 80 cc. ethylene chloride and 11.2 cc. pyridine. While stirring and cooling, a solution of 25.0 g. cinnamoylglycolic acid chloride in 50 cc. of ethylene chloride is added at a rate that a temperature of 20° C. can be maintained. After stirring for another hour at 60° C., the ethylene chloride solution is washed several times with water and sodium carbonate solution, desiccated and reduced to dryness. The residue amounts to 48.0 g. (99.0% of the theory). After recrystallizing from an ethyl acetate-petroleum ether mixture, about 34 g. (approximately a 70% yield) of pure chloramphenicol-cinnamoylglycolate-3 (melting point 140–141° C.) are obtained.

Analysis.—Calculated: 51.75% C; 3.92% H; 5.48% N; 13.88% Cl. Found: 51.69% C, 51.66% C; 4.00% H, 4.27% H; 5.54% N, 5.50% N; 13.89% Cl, 14.06% Cl.

$[\alpha]_D^{20} = +29.9°$ (3.991%, ethanol)
$[\alpha]_D^{20} = +13.7°$ (4.213%, ethyl acetate)

EXAMPLE 8

Chloramphenicol-stearoyllactate-3

18.75 g. chloramphenicol are added to a solution of 80 cc. ethylene chloride and 4.58 g. pyridine. While stirring and cooling, a solution of 21.7 g. stearoyllactic acid chloride in 20 cc. of ethylene chloride are added slowly (within about 30 minutes), whereby a temperature of 5° C. is maintained. After stirring for another hour at 45° C., the solvent is preferably changed by distilling off the ethylene chloride and taking the residue up with ethyl acetate. The solution is then washed with dilute acid, sodium carbonate solution and water and evaporated to dryness.

After recrystallization from an ethyl acetate-petroleum ether mixture, the pure compound having a melting point of 68–71° C. is obtained at a yield of 30.0 g. (80% of the theory).

Analysis.—Calculated: 58.00% C; 7.57% H; 4.24% N; 10.75% Cl. Found: 57.86% C, 57.70% C; 7.43% H, 7.37% H; 4.33% N, 4.50% N; 10.84% Cl, 10.87% Cl.

$[\alpha]_D^{23.5°} = -3.42°$ (4.002%, ethyl acetate)

EXAMPLE 9

Chloramphenicol-stearoylmandelate-3

14.15 g. chloramphenicol are dissolved in 100 cc. of absolute ethyl acetate. While stirring and cooling, a solution of 19.1 g. of stearoylmandelic acid chloride in 50 cc. absolute ethyl acetate is mixed therewith. The temperature of the mixture is adjusted to 20° C. and a solution of 3.46 g. pyridine in 10 cc. of absolute ethyl acetate are added slowly, within a period of 10 minutes. The reaction mixture is brought to room temperature, and is held at this temperature for 30 minutes whereafter it is heated for another 30 minutes to 50° C., while continuously stirring. The ethyl acetate solution is then washed with dilute acid, sodium carbonate solution and water, and is desiccated and reduced to dryness.

After recrystallizing the residue from an ethyl acetate-ligroin mixture, the pure ester having a melting point of 90–93° C. is obtained.

$[\alpha]_D^{24} = +42.4°$ (3.045%, ethanol)
$[\alpha]_D^{25} = +29.1°$ (3.042, ethyl acetate)

We claim:
1. The chloramphenicol-3-mono ester of the formula

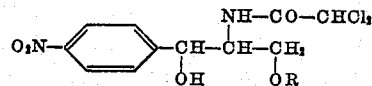

wherein R is a member selected from the group consisting of the stearoyl glycolic acid radical and the stearoyl lactic acid radical.

2. Chloramphenicol-mono-stearoylglycolate-3.
3. Chloramphenicol-stearoyllactate-3.

References Cited in the file of this patent

UNITED STATES PATENTS

| | | |
|---|---|---|
| 2,514,376 | Crooks et al. | July 11, 1950 |
| 2,586,661 | Jacob | Feb. 19, 1952 |
| 2,662,906 | Edgerton | Dec. 15, 1953 |

FOREIGN PATENTS

| | | |
|---|---|---|
| 711,135 | Great Britain | June 23, 1954 |
| 735,704 | Great Britain | Aug. 24, 1955 |